United States Patent [19]

Pierce et al.

[11] Patent Number: 4,470,542
[45] Date of Patent: Sep. 11, 1984

[54] SINGLE CLOSED LOOP FIREPLACE HOME HEATING SYSTEM

[76] Inventors: Jim Pierce; Jan R. J. Pierce, both of 3328 June NE., Albuquerque, N. Mex. 87111

[21] Appl. No.: 457,117

[22] Filed: Jan. 10, 1983

[51] Int. Cl.³ ............................................. F24D 3/00
[52] U.S. Cl. .................................... 237/8 R; 236/10; 237/51; 126/132
[58] Field of Search ..................... 237/8 R, 56, 51, 61; 236/9 A, 10; 126/132, 121, 122

[56] References Cited

U.S. PATENT DOCUMENTS

| | | | |
|---|---|---|---|
| 3,945,369 | 3/1976 | Adams et al. | 126/164 |
| 3,958,755 | 5/1976 | Cleer, Jr. | 237/8 |
| 4,046,320 | 9/1977 | Johnson et al. | 237/8 |
| 4,258,880 | 3/1981 | Williamson | 237/56 |

*Primary Examiner*—Henry Bennett
*Attorney, Agent, or Firm*—Walter R. Keller

[57] ABSTRACT

A home heating system which transfers heat generated in a fireplace, throughout the home using the duct work and furnace fan already installed in a home, having a natural gas fired forced air furnace; said home heating system being an inexpensive, simple closed loop system compatible with the existing forced air furnace heating system. The home heating system having a hydro-grate through which a heat transfer fluid flows, said hydro-grate being placed in the fireplace and the fire in the fireplace heating the heat transfer fluid. The home heating system then pumping the hot heat transfer fluid to cooling radiators which are placed in the cold air plenum of the forced air furnace, and the forced air furnace fan being automatically activated. The electrical circuitry of the activating mechanism of the furnace fan being in parallel with the existing temperature activation of the furnace fan, thus the operation of the forced air furnace is in no way affected.

18 Claims, 3 Drawing Figures

SINGLE CLOSED LOOP FIREPLACE HOME HEATING SYSTEM

BACKGROUND

1. Field of the Invention. This invention relates generally to fireplace heating systems, and particularly to a fireplace heating system suitable for use in heating residences which are already equipped with natural gas fired central forced air furnaces.

2. Description of Prior Art. Fuel shortages and the high cost of home heating fuels have directed great attention on methods and devices for improving the efficiencies of existing home heating systems. Many studies have established that fireplaces are grossly inefficient and in many instances their use actually causes an overall heat loss in the home. One of the major reasons for fireplace inefficiency is the lack of an adequate collection and distribution system.

Several heating systems designed to collect and distribute heat generated in a fireplace have been conceived. ADAMS et al, U.S. Pat. No. 3,945,369 describes an air circulation system. CLEER, U.S. Pat. No. 3,958,755 teaches collection of heat from fireplaces and solar collectors to be distributed through radiators. WILLIAMSON, U.S. Pat. No. 4,258,880 teaches a water heating system, having a substantial storage capacity, a capability of heating water for hot water taps, said system being circulated by a conventional pump, and heat being transferred to living areas by standard radiators. JOHNSON et al, U.S. Pat. No. 4,046,320 teaches a double loop hot water system, in which fireplace generated heat is circulated through standard radiators throughout the home, and in particular to place a radiator in the hot air ducts or in the forced air furnace bonnet, so that in the event the forced air furnace is fired and the fan is activated, the fireplace heat will augment the heat in the already heated air from the furnace.

SUMMARY OF THE INVENTION

Fireplace heating in homes is very inefficient and in a great many homes the primary heating system is a central forced air furnace fired by natural gas, propane, butane, oil and the like. The central forced air heating system is generally integrated into the structure of the home, and has built in duct work to distribute the heated air throughout the home. In contrast, a fireplace usually is located in one room of the home, and has no heat distribution system. The lack of a heat distribution system significantly reduces the efficiency of a fireplace as a heating system, and in fact fireplaces are commonly used primarily for asthetic reasons rather than for heating. It is therefore an object of this invention to provide a safe, simple, and economical means of transfering the heat generated in a fireplace throughout the house, using existing heating systems, without altering or impairing the normal function of the fireplace or the forced air furnace heating system. It is also an objective of this invention to provide a more efficient means of utilizing fireplace generated heat in heating a home, thus reducing home heating costs.

DESCRIPTION OF THE PREFERRED EMBODIMENT

Figure 1:
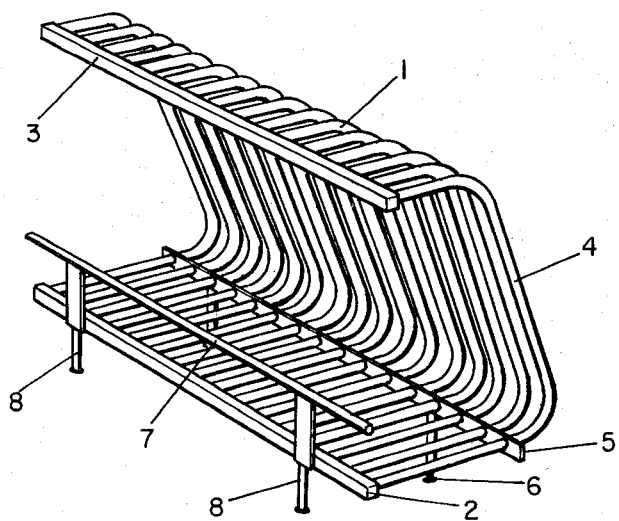
FIG. 1 is an isometric view of the hydro-grate.

FIG. 1 shows a hydro-grate 1 to consist of an inlet manifold 2, and a discharge manifold 3, and a plurality of arcuate heating tubes 4, wherein the arcuate heating tubes 4 are connected in parallel between the intake manifold 2 and the discharge manifold 3. The hydro-grate 1 has a spacing bar 5 through which the arcuate heating tubes 4 pass, said spacing bar 5 providing additional support and rigidity to the hydro-grate 1 and said spacing bar 5 providing a base to which two rear legs 6 can be attached. The inlet manifold 2 has mounted thereon a log retainer 7 and two front legs 8. The arcuate heating tubes are rigidly and without fluid leaks, attached to the inlet manifold 2 and the discharge manifold 3 as by welding. The hydro-grate 1 does not have fins, as it has been found that fins soon become coated with soot and ashes and become very inefficient and useless. Instead, the arcuate heating tubes 4 are spaced sufficiently apart so that ashes from burning wood easily fall below the hydro-grate 1. The smooth tubing of the arcuate heating tubes 4 and the spacing between the tubes also allows for easy and convenient cleaning of the hydro-grate 1. As assembled, the hydro-grate 1 supports the usual log fire in the fireplace, and the arcuate heating tubes 4 absorb heat directly from the burning logs; and the back and top portions of the arcuate heating tubes 4 absorb heat from the flames and hot gases before they escape through the chimney of the fireplace.

Figure 2:
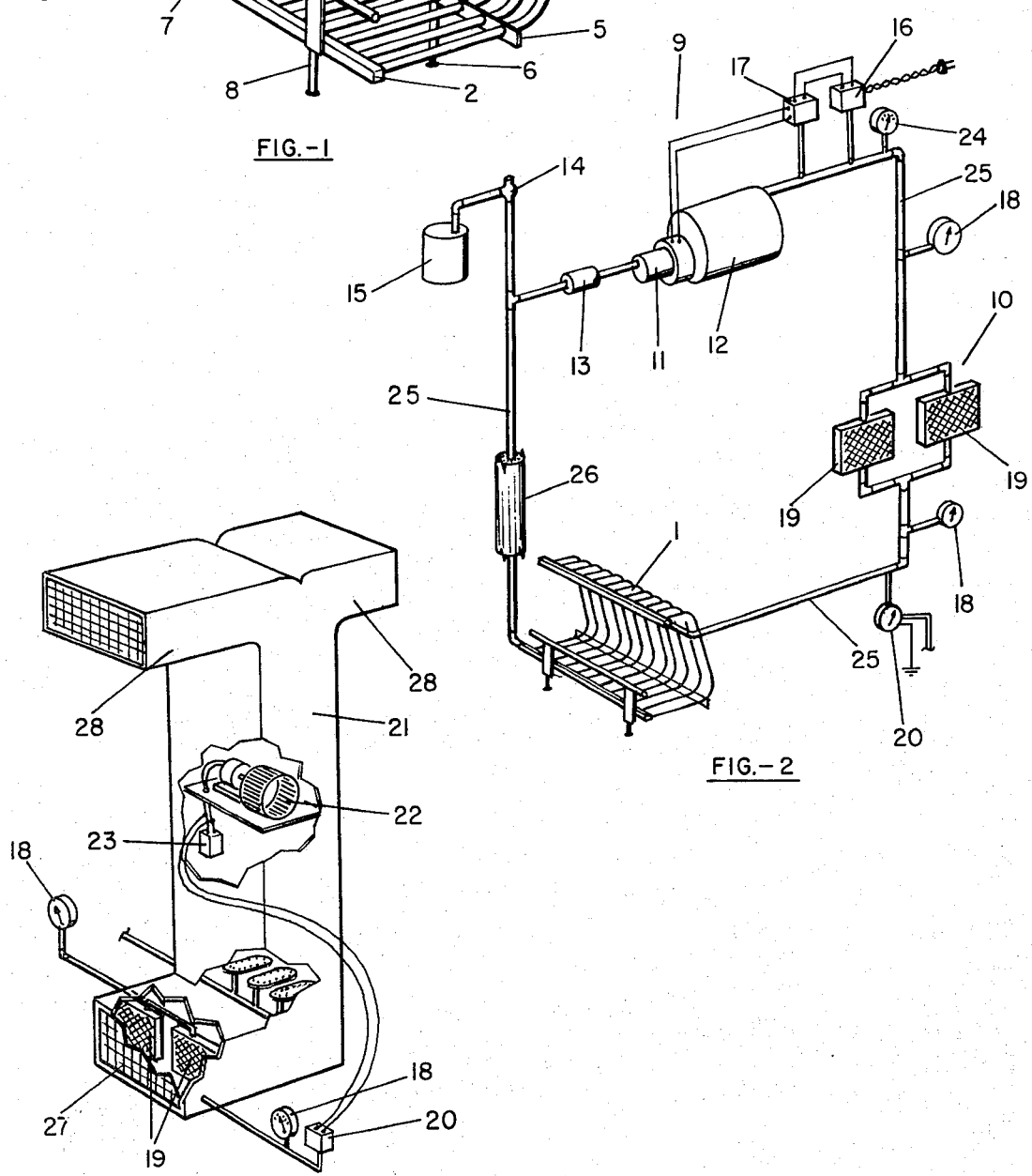
FIG. 2 is a schematic diagram of the system of the invention.

FIG. 2 is a schematic showing the invention to have the aforementioned hydro-grate 1, a pump unit 9, and a cooling unit 10, all connected in series by copper tubing 25. The system heat transfer medium is a fluid. The invention is shown to be a closed single loop system in which the heat transfer fluid is heated in the hydro-grate 1 by the fire in the fireplace, thence circulated to the cooling unit 10; the heat transfer fluid then passes through the pumping unit 9 and returns to the hydro-grate 1 where it is reheated.

The pumping unit 9 is shown in FIG. 2 to have a pump 11, an expansion tank 12, a check valve 13, a pressure relief valve 14, and an overflow reservoir 15. The pump 11 is an electrically operated fluid pump of sufficient capacity and capable of pumping hot fluid at temperatures up to 200° F. A suitable pump is available in Model No. UP26-64F manufactured by Grundofos, 2555 Clovis Ave., Clovis, Ca. The expansion tank 12 is sealed and preferably of metal construction, having sufficient capacity, on the order of one gallon, to act as a reservoir for excess fluid; and, because it is not completely filled, to allow space for thermal expansion of the heat transfer fluid. The check valve 13 is a standard one way fluid check valve. The pressure relief value 14 is also of standard and known construction, and should relieve at a pressure of approximately 30 psi. The overflow reservoir 15 is of any suitable construction and may be of plastic. The overflow reservoir should have sufficient capacity, so that in the event of malfunction, the entire system could be emptied of heat transfer fluid into the overflow reservoir 15; thus avoiding a mess due to spillage, and saving the heat transfer fluid for reuse once the malfunction is corrected.

In an alternate configuration, not shown, the expansion tank 12 is eliminated, and a two way pressure relief valve 14 is installed instead of the standard relief valve 14 and the tube from the relief valve 14 to the overflow reservoir 15 extends to the bottom of the overflow reservoir 15. In this installation which is similar to the cooling system installation on present automobiles, overflow of the heat transfer fluid is expelled into the overflow reservoir 15; but if the system is lacking heat transfer fluid, when cooled the system pressure is reduced and heat transfer fluid is sucked back into the system through the two way pressure relief valve 14 from the overflow reservoir 15.

The pump 11 is electrically operated, preferably by 110 V a.c. and is activated by a sensor switch 16. The sensor switch 16 can be of a variety of types, and could sense any of a variety of events. Sensor switches which are available could be flame detectors, infra-red detectors, smoke detectors, temperature switches, or pressure switches. All of the foregoing sensor switches, except the pressure switches would require to be installed in or near the fireplace. It has been found that the simplest sensor switch is a normally open pressure switch, and is so shown in FIG. 2. As the fire in the fireplace heats the heat transfer fluid, the pressure in the entire system increases because the system is a closed single loop system. This rise in system pressure permits the positioning of the normally open pressure switch 16 in the pump unit 9 instead of in an insightly installation near the fireplace. The rise in system pressure causes the normally open pressure switch 16 to close and thereby activate the pump 11. As a safety feature, a normally closed temperature switch 17, senses the temperature of the heat transfer fluid downstream from pump 11. Should the heat transfer fluid rise above safe levels, about 200° F., the temperature switch 17 opens the electrical circuit to the pump 11, shutting off pump 11. The pressure switch 16 should close with a rise of about 5 psig and have a capacity of up to 50 psig. The temperature switch 17 is also commercially available from many sources, and should be a normally closed switch. The temperature switch 17 should be adjustable to open at temperatures between 180° F. and 240° F. Pressure gauge 24 is installed upsteam of the expansion tank 12 to observe the system pressure. Commercially available pressure gauges with a range up to 50 psig are suitable.

Figure 3:
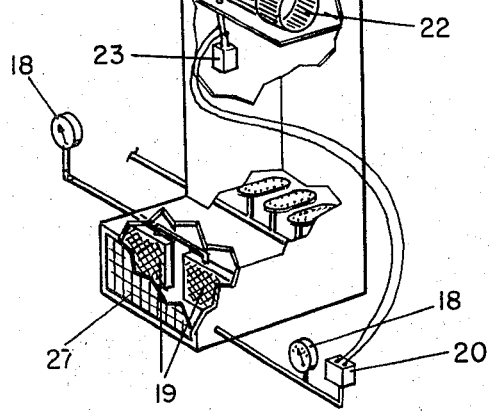
FIG. 3 is a schematic diagram of a typical gas fired forced air heating system with the invention installed therein.

The cooling unit 10 is shown to comprise two thermometers 18 a plurality of radiators 19, and a normally open temperature switch 20. The thermometers 18 are placed in the system, one upstream from th radiators 19 and one downstream from the radiators 19. The thermometers 18 are the dial type for easy reading and are commercially available from many sources in either strap on or immersion types. The thermometers 18 should have a temperature range of at least 50° F. to 250° F. The difference in temperatures between the two thermometers 18 is a measure of the decrease in heat transder fluid temperature due to the cooling from the radiators 19. The radiators 19 are installed transverse to the air flow through the cold air plenum 27 of a forced air furnace 21 already installed in a residence. The typical radiator 19 is a 2×14×16 or a 2×14×20 tube and fin radiator of standard construction, which are commercially available or may be custom built. The number of radiators 19 to be installed in a residence will depend on the geometry of the forced air furnace 21 cold air plenum 27. However, if more than one radiator 19 is installed the radiators should be installed in parallel in the fluid circuitry, to provide more even and efficient heat transfer. As shown in FIG. 3, the forced air furnace 21 has a fan 22 which is activated by a normally open furnace temperature switch 23. The furnace temperature switch 23 senses the rise in temperature in the air, after the forced air furnace 21 is fired, and closes. Closing the furnace temperature switch 23 activates the furnace fan 22 causing heated air to be forced through duct work 28 into the rooms of the residence. Activating the furnace fan also draws cold air from inside the residence through the cold air plenum 27 to the forced air furnace 21. The invention has, upstream of the radiators 19, a normally open temperature switch 20 which senses the temperature of the heat transfer fluid. The normally open temperature switch 20 is wired in parallel with the furnace temperature switch 23, to the furnace fan 22. Thus the furnace fan 22 will be activated either by the furnace temperature switch 23 if the forced air furnace 21 is fired, or by the normally open temperature switch 20 if the fireplace has a fire, or both. The normally open temperature switch 20 is also commercially available in either strap on or immersion types, and should close on a temperature rise of 100° F. to 150° F.

It is also recognized that both the pump 11 and the furnace fan 22 could be activated in a variety of ways. An alternative configuration is to have both the pump 11 and the furnace fan 22 activated by the normally open pressure switch 16, thus eliminating the need for the normally open temperature switch 20. Conversely, positioning the normally open temperature switch near the fireplace, or adjacent to the hydro-grate 1, would permit both the furnace fan 22 and the pump 11 to be activated by the normally open temperature switch 20, eliminating the need for the normally open pressure switch 16. Similarly, the normally open pressure switch 16 and the normally open temperature switch 20 could be connected to a double pole switch requiring both temperature and pressure conditions to obtain to activate both the pump 11 and the furnace fan 22. Such modifications are contemplated as being within the definitions of the pumping unit 9 and the cooling unit 10.

The discharge manifold 3 of the hydro-grate 1 is connected by copper tubing 25 to the first thermometer 18 of the cooling unit 10, then to the normally open temperature switch 20, and then to the radiators 19. The radiators 19 are then connected by copper tubing 25 through the second thermometer 18 to the pressure gauge 24 of the pump unit 9. The pump unit 9 is then connected to the inlet manifold 2 of the hydro-grate 1 to complete the closed single loop circuitry. It has been found that to provide proper fluid circulation, the copper tubing 25 should be a minimum of five-eighths of an inch, outside diameter. It has also been determined that in a normal single family residence, the installation of the system will result in a fluid capacity of less than five gallons.

The system heat transfer fluid is normally a water - ethylene glycol mixture with anti-corrosive additives. The best solution has been found to be fifty percent automotive anti-freeze with corrosive inhibitors, and fifty percent water. The use of plain water will be satisfactory for a short while, but a build up of scale deposits in the hydro-grate 1 will occur reducing the circulation of the heat transfer fluid and resulting in severely reduced efficiency. Eventually, continued use of water will result in a total clogging of the hydro-grate 1. In addition the use of water invites other safety hazards. The scale deposits may come loose from the hydro-grate 1, circulate through the system and clog the pressure relief valve 14. Use of water allows the tubing to freeze if exposed to inclement winter weather causing ruptured tubing, and possible explosions. With the use of the anti-freeze mixture, the problems with scale deposits, clogged system, and freezing are virtually eliminated.

Additional features which are ancillary to or additive to the invention which increase the overall system performance are: first, the use of glass fireplace doors (not shown) relatively sealed around the fireplace with a damper control to limit the fire and rate of burning in the fireplace and to limit the rate of heating of the heat transfer fluid; and second to apply insulation 26 to the copper tubing 25. The insulation 26 is commercially available in fiberglas or foam in snap on form. Use of insulation 26 reduces heat loss from the copper tubing 25, and prevents the hot copper tubing 25 from being exposed to structure or personnel.

In operation, all that is needed to activate the installed system is to build a fire in the fireplace. The heat in the fireplace heats the transfer fluid in the hydro-grate 1 and causes a system pressure rise. The system pressure rise is sensed by the normally open pressure switch 16 in the pumping unit 9, thereby causing the activation of the pump 11 which begins circulating the heat transfer fluid. As the heat transfer fluid circulates, the heated fluid moves through the radiators 19 and the temperature rise in the fluid in the radiators is sensed by the normally open temperature switch 20, which closes. Closing of the normally open temperature switch 20, activates the furnace fan 22 of the forced air furnace 21. The furnace fan 22 draws air through the cold air plenum 27 of the forced air furnace 21 causing the air to be heated as it passes through the radiators 19. The heated air is distributed through the forced air furnace 21 and its associated duct work 28 to the rooms of the residence. The heated transfer fluid, now cooled in the radiators 19 continues to the expansion tank 12 and pump 11 and finally back to the hydro-grate 1. In the event that the system pressure exceeds the normal safe level, the pressure relief valve 14 opens, venting system fluid, steam and vapor to the overflow reservoir 15. In the event that system temperature exceeds desireable limits, the normally closed temperature switch 17 opens, stopping the pump 11 and thus protects the pump 11 which is the most susceptible component to damage by high temperature.

When the fire in the fireplace dies out the heat transfer fluid is cooled until the temperature of the heat transfer fluid is reduced sufficiently to permit the normally open temperature switch 20 to open, thereby shutting off the furnace fan 22. Next the system pressure decreases to a point where the normally open pressure switch 16 opens and shuts off the system pump 11. It is important here to note that the normally open temperature switch 20 must be set to open before the normally open pressure switch 16 opens in order to prevent the furnace fan 22 from circulating cold air throughout the residence. The system is of relatively small capacity on the order of five gallons liquid, in an ordinary single family installation in a dwelling. The system is useable in homes, offices, apartments, or other similar buildings. Only the hydro-grate 1 will be obvious, since the copper tubing 25, the pumping unit 9, and the cooling unit 10 can be installed in inconspicuous places. The use of wateranti-freeze heat transfer medium permits the installation of the pumping unit in the garage, or even out of doors. The cooling unit 10 is easily installed inside the cold air plenum 27 of the forced air furnace 21 and completelt hidden from view. No major structural modifications are required in a normal installation.

I claim:

1. A system for heating homes and other buildings, when said homes and other buildings have installed therein a fireplace and a forced air furnace, said system comprising: a pump, a cooling unit, a hydro-grate, and tubing connecting the pump unit, cooling unit and hydro-grate in single closed loop fluid circuitry, and a heat transfer fluid, wherein the pump unit is electrically operated and activated by a pressure sensitive switch within the system, said switch being activated by a build up of pressure in the single closed loop system caused by thermal expansion of the heat transfer fluid occasioned by absorption therein of heat from a fire in the fireplace; and wherein the cooling unit is installed in a cold air plenum of the forced air furnace, and wherein a furnace fan in the forced air furnace is activated automatically through a system sensor connected in parallel to an existing normally open temperature switch in the forced air furnace, and said system sensor detecting the presence or absence of useable heat within the fireplace or the system; and wherein the hydro-grate is installed in the fireplace and heat from the fire in the fireplace heats the heat transfer fluid therein causing the pressure and temperature of the heat transfer fluid in the single closed loop system to rise.

2. The system of claim 1 wherein the pump unit comprises: a pump, a check valve, an expansion tank, a pressure gauge, a normally open pressure switch, a normally closed temperature switch, a pressure relief valve and an overflow reservoir wherein the pump is connected in series downstream of the expansion tank, and wherein the normally open pressure switch and the pressure gauge are connected in series upstream of the expansion tank, and wherein downstream of the pump the normally closed temperature switch and the check valve and the pressure relief valve are connected in series, and wherein the pressure relief valve vents into the overflow reservoir; and wherein the pump is electrically operated and wherein the normally open pressure switch closes with a rise in the system pressure and activates the pump, thereby circulating the heat transfer fluid and wherein the normally closed temperature switch, in the event of a malfunction, senses a rise in system temperature beyond desireable limits, opens and deactivates the pump.

3. The system of claim 1 wherein the hydro-grate comprises: an inlet manifold, a discharge manifold, a plurality of arcuate heating tubes, a spacer bar, a log retainer, two rear legs and two front legs, wherein the arcuate heating tubes are rigidly connected and sealed to the inlet manifold and to the discharge manifold in parallel fluid circuitry, and wherein the arcuate heating tubes pass through and are rigidly attached to the spacer bar, and wherein the log retainer is rigidly attached to the discharge manifold, and wherein the two rear legs are affixed to the spacer bar, and the two front legs are affixed to the discharge manifold, and wherein the hydro-grate is placed in the fireplace and the logs for a fire are placed on the arcuate heating tubes, and wherein the fire and hot gases heat the heat transfer fluid in the inlet manifold, discharge manifold and arcuate heating tubes, thereby raising the temperature and pressure of the system.

4. The system of claim 1 wherein the pump unit is activated by a flame detector placed in the fireplace.

5. The system of claim 1 wherein the pump unit is activated by an infra-red detector placed in the vicinity of the fireplace.

6. The system of claim 1 wherein the furnace fan is activated by a flame detector placed in the fireplace.

7. The system of claim 1 wherein the furnace fan is activated by an infra-red detector placed in the vicinity of the fireplace.

8. The system of claim 1 wherein the pump unit and the furnace fan are activated by pressure switch and a temperature switch, both said switches acting on a double pole switch so that both the desired pressure and temperature conditions must occur before either the pump unit or the furnace fan are activated.

9. A system for heating homes and other buildings, when said homes and other buildings have installed therein a fireplace and a forced air furnace, said system comprising:

a pump unit, a cooling unit, a hydro-grate, and tubing connecting the pump unit, cooling unit and hydro-grate in single closed loop circuitry, and a heat transfer fluid, wherein the pump is electrically operated, and wherein the cooling unit is installed in a cold air plenum of the forced air furnace, and wherein the cooling unit comprises a plurality of radiators, a normally open temperature switch, and two thermometers, wherein one thermometer is installed, in series with the radiators, downstream and one thermometer is installed, in series up stream from the radiators, and wherein the radiators are connected in parallel fluid circuitry with each other, and wherein the normally open temperature switch is installed upstream from the radiators, and wherein the thermometers measure the temperatures of the heat transfer fluid entering and leaving the radiators, and wherein the normally open temperature switch closes when the temperature of the heat transfer fluid raises sufficiently, and wherein the closing of the normally open temperature switch activates a furnace fan in the forced air furnace, and wherein the normally open temperature switch is wired in parallel with a normally open temperature switch in a hot air plenum of the forced air furnace, and wherein because the radiators are installed in the cold air plenum of the forced air furnace, the activated forced air furnace fan draws air transverse to the radiators heating said air; and wherein the hydro-grate is installed in the fireplace and heat from a fire in the fireplace heats the heat transfer fluid therein causing a rise in the pressure in the system, and wherein a pressure sensitive switch sense the rise in pressure and activates the pump unit, said pressure sensitive switch being in the pump unit thereby circulating the heat transfer fluid through the hydro-grate, cooling unit, and pump unit in single closed loop fluid circuitry.

10. The system of claim 9 wherein the pump unit comprises: a pump unit, a check valve, an expansion tank, a pressure gauge, a normally open pressure switch, a normally closed temperature switch, a pressure relief valve and an overflow reservoir wherein the pump is connected in series downstream of the expansion tank, and wherein the normally open pressure switch and the pressure gauge are connected in series upstream of the expansion tank, and wherein downstream of the pump the normally closed temperature switch and the check valve and the pressure relief valve are connected in series, and wherein the pressure relief valve vents into the overflow reservoir; and wherein the pump is electrically operated and wherein the normally open pressure switch closes with a rise in the system pressure and activates the pump, thereby circulating the heat transfer fluid and wherein the normally closed temperature switch, in the event of a malfunction, senses a rise in system temperature beyond desireable limits, opens and deactivates the pump.

11. The system of claim 9 wherein the hydro-grate comprises: an inlet manifold, a discharge manifold, a plurality of arcuate heating tubes, a spacer bar, a log retainer, two rear legs and two front legs, wherein the arcuate heating tubes are rigidly connected and sealed to the inlet manifold and to the discharge manifold in parallel fluid circuitry, and wherein the arcuate heating tubes pass through and are rigidly attached to the spacer bar, and wherein the log retainer is rigidly attached to the discharge manifold, and wherein the two rear legs are affixed to the spacer bar, and the two front legs are affixed to the discharge manifold, and wherein the hydro-grate is placed in the fireplace and the logs for a fire are placed on the arcuate heating tubes, and wherein the fire and hot gases heat the heat transfer fluid in the inlet manifold, discharge manifold and arcuate heating tubes, thereby raising the temperature and pressure of the system.

12. The system of claim 9 wherein the pump is activated by a flame detector placed in the fireplace.

13. The system of claim 9 wherein the pump unit is activated by an infra-red detector placed in the vicinity of the fireplace.

14. The system of claim 9 wherein the furnace fan is activated by a flame detector placed in the fireplace.

15. The system of claim 9 wherein the furnace fan is activated by an infra-red detector placed in the vicinity of the fireplace.

16. The system of claim 9 wherein the pump unit and the furnace fan are activated by pressure switch and a temperature switch, both said switches acting on a double pole switch so that both the desired pressure and temperature conditions must occur before either the pump unit or the furnace fan are activated.

17. The system of claim 1 wherein the pump unit and the furnace fan are activated by a pressure switch, said pressure switch acting on a double pole switch so that both the furnace fan and the pump unit are activated, at the same time.

18. The system of claim 9 wherein the pump unit and the furnace fan are activated by a pressure switch, said pressure switch acting on a double pole switch so that both the furnace fan and the pump unit are activated at the same time.

* * * * *